C. R. BAILEY.
VALVE CAP.
APPLICATION FILED AUG. 8, 1911.

1,051,058.

Patented Jan. 21, 1913.

Witnesses.
E. R. Pollard
C. Severance

Inventor.
Clarence R. Bailey.
By Hazard Strauss
Attys.

UNITED STATES PATENT OFFICE.

CLARENCE R. BAILEY, OF LOS ANGELES, CALIFORNIA.

VALVE-CAP.

1,051,058.

Specification of Letters Patent.  Patented Jan. 21, 1913.

Application filed August 8, 1911.  Serial No. 643,052.

*To all whom it may concern:*

Be it known that I, CLARENCE R. BAILEY, a citizen of the United States, residing at Los Angeles, in the county of Los Angeles and State of California, have invented new and useful Improvements in Valve-Caps, of which the following is a specification.

This invention relates to improvements in valve caps and has particular relation to caps for the valves of pneumatic tires such as are employed upon vehicles, automobiles, motor-cycles, bicycles, and the like.

It is the object of the invention to provide a cap which may be secured in place over the valve of an ordinary pneumatic tire, the said cap being provided with means by which it may be turned into or out of position on said tire.

It is also an object of the invention to provide a cap for pneumatic tires which is provided with arms adapted to be screwed into the nipple of the tire to permit of the escape of air through the valve thereof.

It is also an object of the invention to provide a cap of the class described which is formed with folding arms that may be turned outwardly for turning the cap and may then also be used in depressing the valve, the said arms being capable of folding against the sides of the cap whereby an outer inclosing cap may be placed over the whole structure.

Figure 1:
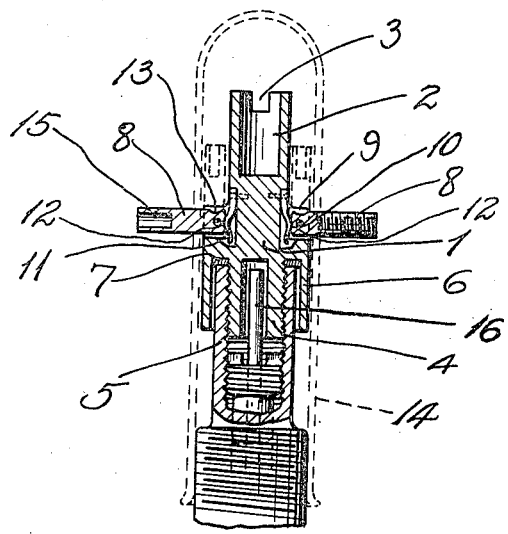
Figure 2:
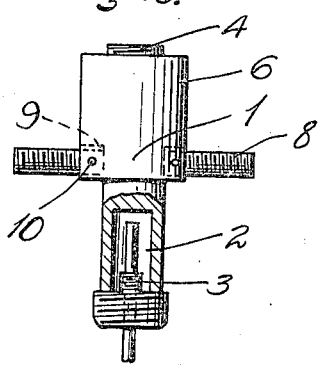
Figure 3:
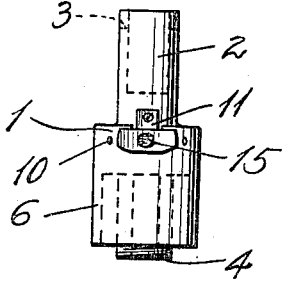
Figure 4:
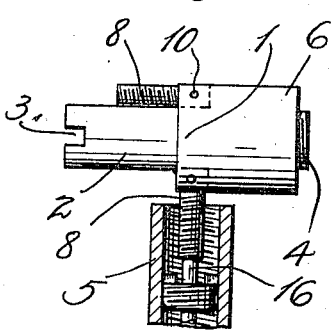
Figure 5:
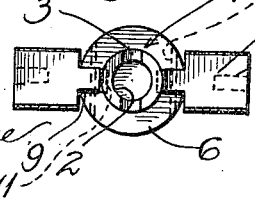

In the accompanying drawing forming a part of this specification, Figure 1 is a central sectional view taken through the improved cap forming the subject matter of this invention, in position upon the nipple of the pneumatic tire, a portion of the nipple being also shown in elevation. Fig. 2 is a side elevation of the improved cap, a portion of the valve engaging end thereof being in section. Fig. 3 is a side elevation of the cap looking at the end of one of the arms when it is turned outwardly into operative position. Fig. 4 is a side elevation of the said cap showing one of the arms thereof screwed into the nipple of the pneumatic tire, to depress the valve stem thereof and to permit the escape of air. Fig. 5 is a top plan view of the cap with its arms extended.

The details of the invention will now be more particularly described reference being had to the drawing, in which 1 indicates the body portion of the cap, 2 a hollow projecting upper portion having notches 3 in its edge, capable of engaging, when inverted, the valve mechanism of the pneumatic tire, for screwing or unscrewing the same. The said cap is also formed with an inner cylindrical portion 4, having exterior threads adapted to engage the internal threads of the tire nipple 5. The said cap also has an outside cylindrical portion 6 adapted to extend over the end of the nipple. The annular space between the said flanges 4 and 6 is adapted to receive the washer 7 of yielding or other material, so that when the cap is screwed down tightly upon the nipple 5, an air tight joint may be formed at the upper edge of said nipple. In this way the cap may be made to positively prevent any leakage of air from the tire in the event of the valve mechanism not completely closing the same or being imperfect.

Thus far the cap is similar to the cap described and claimed by me in a previous application for patent, filed April 3, 1911, S. N. 618,661. The cap of the present invention is an improvement, however, upon the cap of the previous application referred to, the said improvement relating particularly to the formation and mounting of the arms which will now be described.

The cap is provided with a plurality of laterally projecting arms 8 preferably two in number, as shown in the drawing. The said arms 8 are pivoted at their inner ends in recesses or sockets 9 formed in the sides of the body portion 1. The pivot pins 10 of said arms are fastened in the body portion 1 and springs 11 also secured to the body portion 1 of the cap project at their free ends into the recesses 9 so as to bear upon the inner ends of the arms 8 when the arms are turned outwardly. The said inner ends are formed with recesses or depressions 12 which are adapted to have the curved portions of the springs 11, as shown in the drawing, fit therein and prevent the arms from accidentally folding upon their pivots. The side faces of the arms are also provided with depressions or recesses 13 which are brought into engagement with the holding springs 11 when the arms are folded in the position shown in dotted lines in Fig. 1 or full lines in Fig. 4. The arms thus are held under spring tension at the extremities of their movement and may be readily snapped from one position to the other if desired. When the arms are folded they are arranged within the circumference of the body portion 1 of the cap so that they will not interfere with the placing over the said cap of an outer cover or cap 14 as indicated in dotted lines in Fig. 1. The arms are each provided in their outer ends with sockets 15 which will engage and fit upon a valve stem 16 of the valve mechanism when it is desired to depress the same. The said arms 8 are preferably made flat in cross section as indicated in the view of one of the arms in Fig. 3, and the edge portions of said arms are screw threaded so as to permit of their engaging the internal threads of the nipple 5. The arms are thus capable of being screwed into the end of the nipple so as to force the valve stem downwardly and hold the valve open to permit the air to escape from the tire. It is thus not necessary for the operator to continue to hold the valve. The arms are also further useful in affording means for turning the cap and tightening it in place when it is placed upon the nipple.

What I claim is:—

1. A cap for valve stems, comprising a body portion having arms pivoted thereto, the said arms being flattened at the sides and formed with screw threaded edges whereby they are adapted to be inserted in the end of a valve stem for holding the valve mechanism open.

2. A valve stem cap comprising a body portion having flanges adapted to fit upon the nipple of a tire and adapted to be screwed tightly upon the said nipple to prevent the escape of air, arms pivotally mounted on the sides of said cap and adapted to be turned outwardly for turning the cap, springs engaging said arms and tending to hold them in the extremes of their positions.

3. A cap for tire nipples comprising a body portion adapted to be screwed upon said nipple and provided with means for unscrewing the valve mechanism, pivoted arms secured to the said cap, the body portion of the cap being provided with recesses to receive the same, the arms having depressions in their ends and sides, and springs adapted to engage said depressions for holding the arms in their extended or folded positions.

In witness that I claim the foregoing I have hereunto subscribed my name this 2nd day of August, 1911.

CLARENCE R. BAILEY.

Witnesses:
 EDMUND A. STRAUSE,
 E. STADTMAN.

---

Copies of this patent may be obtained for five cents each, by addressing the "Commissioner of Patents, Washington, D. C."